United States Patent [19]

Takahashi et al.

[11] Patent Number: 4,513,327
[45] Date of Patent: Apr. 23, 1985

[54] DIGITAL SIGNAL RECORDING SYSTEM AND REPRODUCING APPARATUS

[75] Inventors: Nobuaki Takahashi, Yamato; Seiichi Takashima, Ayase; Takeshi Shibamoto, Sagamihara; Fujio Suzuki, Machida; Koji Tanaka, Tokyo, all of Japan

[73] Assignee: Victor Company of Japan, Ltd., Yokohama, Japan

[21] Appl. No.: 478,455

[22] Filed: Mar. 24, 1983

[30] Foreign Application Priority Data

Mar. 30, 1982 [JP] Japan ................... 57-51925
Mar. 30, 1982 [JP] Japan ................... 57-51926
Mar. 30, 1982 [JP] Japan ................... 57-51927
Mar. 30, 1982 [JP] Japan ................... 57-51928

[51] Int. Cl.³ .............................. H04N 5/92
[52] U.S. Cl. ................................. 358/310
[58] Field of Search .................. 358/310, 330

[56] References Cited

U.S. PATENT DOCUMENTS 4,429,334  1/1984  Hashimoto et al. ............ 358/310

OTHER PUBLICATIONS

Morrison, "Videotape Recording: Digital Component Versus Digital Composite Recording", SMPTE Journal, Sep. 1982, pp. 789-796.

Primary Examiner—Donald McElheny, Jr.
Attorney, Agent, or Firm—Louis Bernat

[57] ABSTRACT

A digital signal recording system and a reproducing apparatus for reproducing signals recorded according to this recording system comprise a circuit for alternately transmitting a first digital luminance signal and a first two kinds of digital color difference signals obtained by subjecting a color picture information signal to digital pulse modulation, in terms of information of one or a plurality of scanning lines, and producing a first digital video signal having a signal format wherein signal components of two sampling points of the first digital luminance signal are arranged within the same word and signal components of the same sampling point on a picture of the first two kinds of digital color difference signals are arranged within the same word; a circuit for time-sequentially multiplexing the first digital video signal and the digital audio signals obtained by subjecting audio information signal to be recorded to digital pulse modulation, in terms of words, and recording the time-sequentially multiplexed signal onto the same one track on a recording medium; a decoder for demodulating and reproducing analog audio signals from a signal picked up and reproduced from the recording medium; and a circuit for producing an analog video signal in accordance with a standard television system, from the output first digital video signal of the decoder.

11 Claims, 12 Drawing Figures

PRIOR ART 69

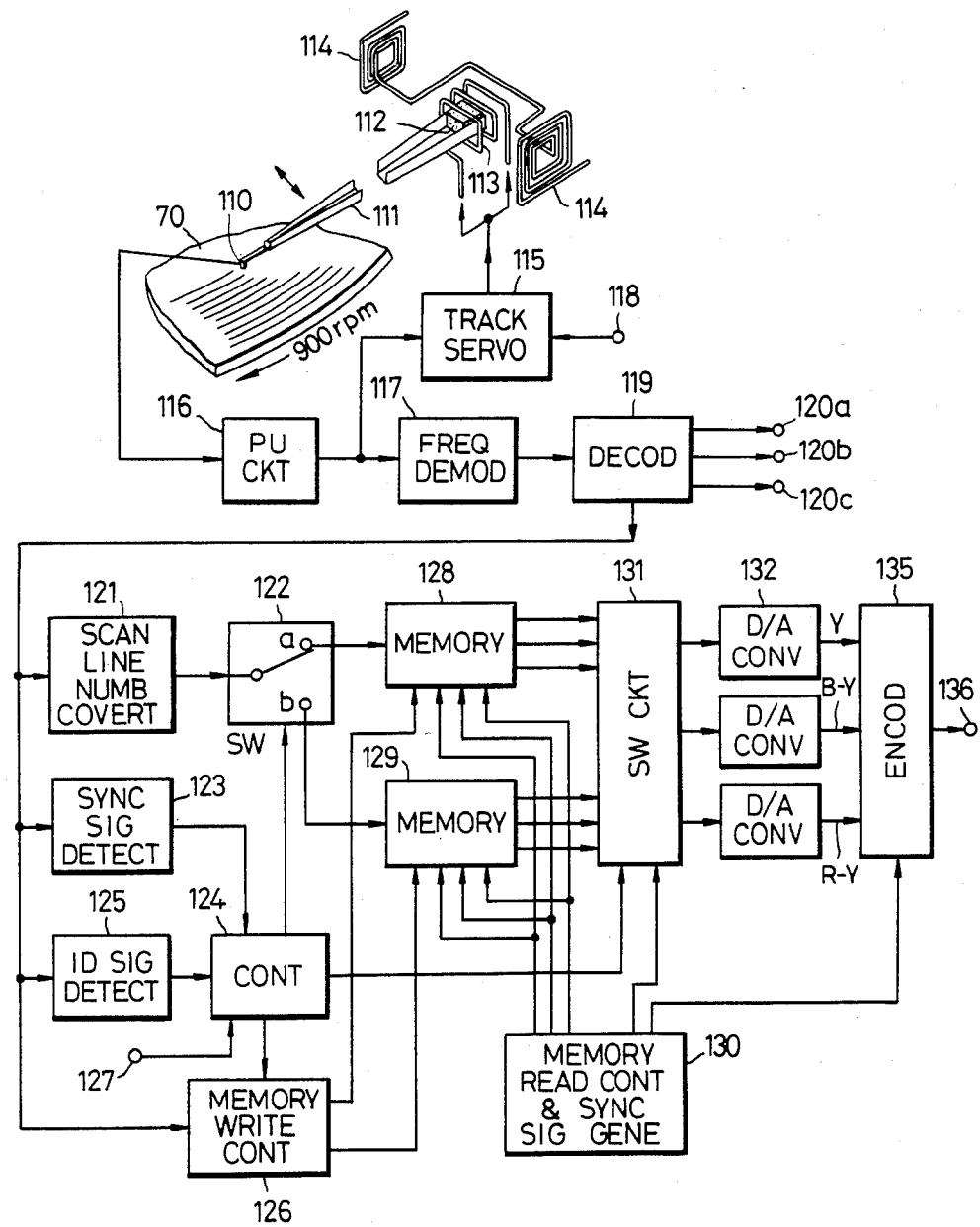

DIGITAL SIGNAL RECORDING SYSTEM AND REPRODUCING APPARATUS

BACKGROUND OF THE INVENTION

The present invention generally relates to digital signal recording systems and reproducing apparatuses for reproducing signals recorded by such recording systems, and more particularly to a system for time-sequentially multiplexing a digital video signal of a component encoding system obtained by subjecting an analog video signal related to a color still picture information to digital pulse modulation, with a digital audio signal which is a main information and recording the time-sequentially multiplexed signal onto a rotary recording medium, and a reproducing apparatus for reproducing the signal recorded onto the rotary recording medium according to this recording system.

Recently, systems which record a digital video signal obtained by subjecting video and audio signals to digital pulse modulation such as pulse code modulation (PCM) and a digital audio signal onto a rotary recording medium (hereinafter simply referred to as a disc) as variations in geometrical configuration, and reproduce the recorded signal as variations in the intensity of light reflected from the disc or variations in electrostatic capacitance, have been developed and realized. Further, recording systems have been proposed for digital audio discs, according to which a digital video signal comprising color still picture information is added to a digital audio signal and recorded together on the same track on the disc. Generally, a plurality of music programs are recorded on the same side of such a digital audio disc, and the digital video signal comprising the color still picture information is recorded in correspondence with each of the recorded music programs. When reproducing such a digital audio disc, the music programs on the disc can be reproduced by a reproducing system which is common throughout the world. However, the television systems are not common throughout the world, and there roughly exist three kinds of television systems. Accordingly, in order to enable reproduction of the video signal recorded on the disc even if the television system employed in a region or country is different from the television system of the recorded video signal, it is first necessary to convert the recorded video signal into a signal format in accordance with the television system of the reproducing apparatus used in that region or country before obtaining a reproduced picture. The information content of the above digital video signal relates to a color still picture which helps the listener's imagination when he listens to the reproduced sounds of the digital audio signal. Hence, it is desirable to reproduce the digital video signal from the disc in the signal formats which are in accordance with each of the television systems, regardless of the differences in the television systems throughout the world.

The color television systems throughout the world can roughly be divided into three systems, that is, NTSC, PAL, and SECAM systems, according to the transmission formats of the chrominance signal. The horizontal scanning frequency of the NTSC system is 15.734 kHz while the horizontal scanning frequency of the PAL and SECAM systems are mainly 15.625 kHz, and the difference between the horizontal scanning frequencies does not become a big problem since the difference is only in the range of 0.7%. However, the number of scanning lines and the vertical scanning frequency in the NTSC system respectively are 525 lines and 59.94 Hz, while they are mainly 625 lines and 50 Hz in the PAL and SECAM systems. Accordingly, if the number of scanning lines of the recorded video signal is 525 lines, the number of scanning lines must be increased to 625 lines when reproducing the recorded video signal as a signal in accordance with the PAL system or the SECAM system, and results in the lack of information. Thus, in order to prevent this lack of information, the recorded video signal must have 625 scanning lines, and upon reproduction, the recorded video signal is reproduced as it is with the 625 scanning lines or the number of scanning lines is reduced to 525 lines.

In this case, the time required to transmit one frame of video signal having 625 scanning lines and the capacity of a frame memory circuit required for storing one frame of such a video signal, must respectively be larger than those required with respect to a video signal having 525 scanning lines. However, as described before, the video signal relates to still picture information and merely helps the listener with his imagination, and it is desirable for the reproduced picture to remain unchanged for a predetermined time rather than change instant by instant. Hence, with respect to the increase in the transmission time of the video signal, no inconveniences are introduced even when the transmission time increases by approximately 20%.

On the other hand, regarding the use of a frame memory circuit having a large capacity, a reproduced video signal of a higher quality can be obtained when obtaining a reproduced video signal in accordance with the PAL system or the SECAM system, compared to the case where the number of scanning lines of the video signal is increased and converted into 625 lines from 525 lines. However, such an effect cannot be obtained when obtaining a reproduced video signal in accordance with the NTSC system. On the other hand, because the video signal comprising the still picture information is transmitted at a low speed, a converting circuit for converting the number of scanning lines which is required to obtain the reproduced video signal in accordance with the NTSC system may be operated at a low speed, and there is no need to unnecessarily increase the capacity of the frame memory circuit.

In addition, when recording a digital video signal which is obtained by digitally modulating an analog video signal of a first television system onto the disc and reproducing the recorded digital video signal as an analog video signal of a second television system, the present inventors have previously proposed a system which obtains a digital video signal having a predetermined sampling frequency by setting a read-out speed from the memory circuit to a predetermined speed and then passing the digital video signal thus obtained through a digital-to-analog converter, in a Japanese Laid-Open Patent Application No. 57-160290 (Japanese Patent Application No. 56-46700). However, this previously proposed system was complex. Moreover, when the first television system was the NTSC system, there were problems in that the frequency band of the luminance signal became limited, the vertical resolution became low, and degradation was introduced in the reproduced picture.

In order to eliminate the above described problems of the previously proposed system, the present inventors have thus devised another digital signal recording system in a Japanese Patent Application No. 56-139567.

According to this devised system, one frame (or one field) of the video signal related to the color still picture information comprises a luminance signal and two color difference signals (B−Y) and (R−Y), and three kinds of digital video signals are obtained by independently subjecting the luminance signal and the two color difference signals to digital pulse modulation. The three kinds of digital video signals are successively and time sequentially transmitted, and this devised system is in accordance with a component encoding system.

However, according to this devised digital signal recording system, one frame (or one field) of the digital luminance signal is recorded, one frame (or one field) of the first digital color difference signal is recorded thereafter, and one frame (or one field) of the second digital color difference signal is recorded after the first digital color difference signal. Hence, if the operator attempts to change the still picture being displayed when reproducing a disc recorded according to such a recording system, the two kinds of color information will successively change in terms of one picture after the luminance information of the still picture of one picture changes. As a result, there was a disadvantage in that the reproduced picture was irregular and unpleasant to watch.

SUMMARY OF THE INVENTION

Accordingly, it is a general object of the present invention to provide a novel and useful digital signal recording system and a reproducing apparatus for reproducing signals recorded by such a recording system, in which the above described disadvantages have been overcome.

Another and more specific object of the present invention is to provide a digital signal recording system and a reproducing apparatus for reproducing signals recorded by such a recording system, which alternately records a digital luminance signal and two kinds of digital color difference signals related to color still picture information in terms of information of one or a plurality of scanning lines, so that the digital luminance signal and the two kinds of color difference signals can be reproduced within substantially the same time band. According to the present invention, when changing the picture display by gradually reducing the display area of the first still picture within the picture display while increasing the display area of the second still picture by the amount corresponding to the reduced display area of the first still picture to finally obtain display of only the second still picture within the picture display, for example, this changing of the picture display can be carried out in a suitable manner introducing substantially no degradation in the picture quality.

Still another object of the present invention is to provide a digital signal recording system and a reproducing apparatus for reproducing signals recorded by such a recording system, which transmits signal components of the digital luminance signal at two sampling points by one word, and transmits the signal components of the two kinds of digital color difference signals at the same sampling point on the picture by the same word. According to the present invention, even if a time shift corresponding to one word is introduced, for example, the distortion introduced in the picture due to this time shift is kept to a minimum, because picture images of the shifted sampling points appear at horizontal ends of the picture and the shift only corresponds to two sampling points.

Another object of the present invention is to provide a digital signal recording system, which records a digital video signal in which picture information of scanning lines in a first field and picture information of scanning lines in a second field alternately exists and the picture information are successively and time sequentially arranged from the top scanning line in the picture, onto a recording medium together with digital audio signals, and a reproducing apparatus for reproducing signals recorded by such a recording system. According to the present invention, conversion of the number of scanning lines can easily be carried out by a simple operation.

Still another object of the present invention is to provide a digital signal reproducing apparatus comprising a digital-to-analog converting circuit constituted by a first digital-to-analog converter for subjecting a digital luminance signal from memory means to digital-to-analog conversion, and a second digital-to-analog converter supplied with an output of a first switching circuit which alternately and selectively produces two kinds of digital signals, where an output color difference signal of the second digital-to-analog converter is supplied to a second switching circuit so that a first color difference signal is selectively produced through a first output terminal and a second color difference signal is selectively produced through a second output terminal. According to the present invention, the construction of the digital-to-analog converting circuit is simple. Moreover, the switching of the analog color difference signals can easily be carried out, because the sampling frequencies of the digital color difference signals are low compared to the sampling frequency of the digital luminance signal.

Another object of the present invention is to provide a digital signal recording system and a reproducing apparatus for reproducing signals recorded by such a recording system, which records an identification signal to first and second digital video signal which are to be recorded onto a recording medium, where the second digital video signal comprises information quantity compressed to several fractions of the information quantity of the first digital video signal. The identification signal comprises a picture classification identification code for identifying for at least identifying the first and second digital video signals, and a picture number identification code which indicates the recording order from the point where the recording is started on the recording medium. According to the present invention, it is possible to display a color still picture of high quality from the first digital video signal, and a color still picture of the second digital video signal having the short transmission time is displayed during a random access. Thus, the apparent operating time during the random access is reduced. Moreover, the color still pictures may be changed quickly. In addition, it is possible to carry out special effects such as fade-in and fade-out with respect to the still picture of the first digital video signal, by using the reproducing interval of the second digital video signal.

Still another object of the present invention is to provide a digital signal recording system and a reproducing apparatus for reproducing signals recorded by such a system, according to which the same identification signal is recorded a plurality of times at starting positions and terminal positions of the first and second digital video signals, and these identification signals are reproduced upon reproduction. According to the present invention, it is possible to reduce errors introduced upon transmission. In addition, it is possible to prevent display of a distorted color still picture, by comparing both the identification signals at the starting and terminal positions of the digital video signal and displaying the color still picture of that digital video signal only when the two identification signals coincide.

Other objects and further features of the present invention will be apparent from the following detailed description when read in conjunction with the accompanying drawings.

BRIEF DESCRIPTION OF THE DRAWINGS

FIG. 11 is a systematic block diagram showing an embodiment of a digital signal reproducing apparatus according to the present invention.

DETAILED DESCRIPTION

Figure 1:
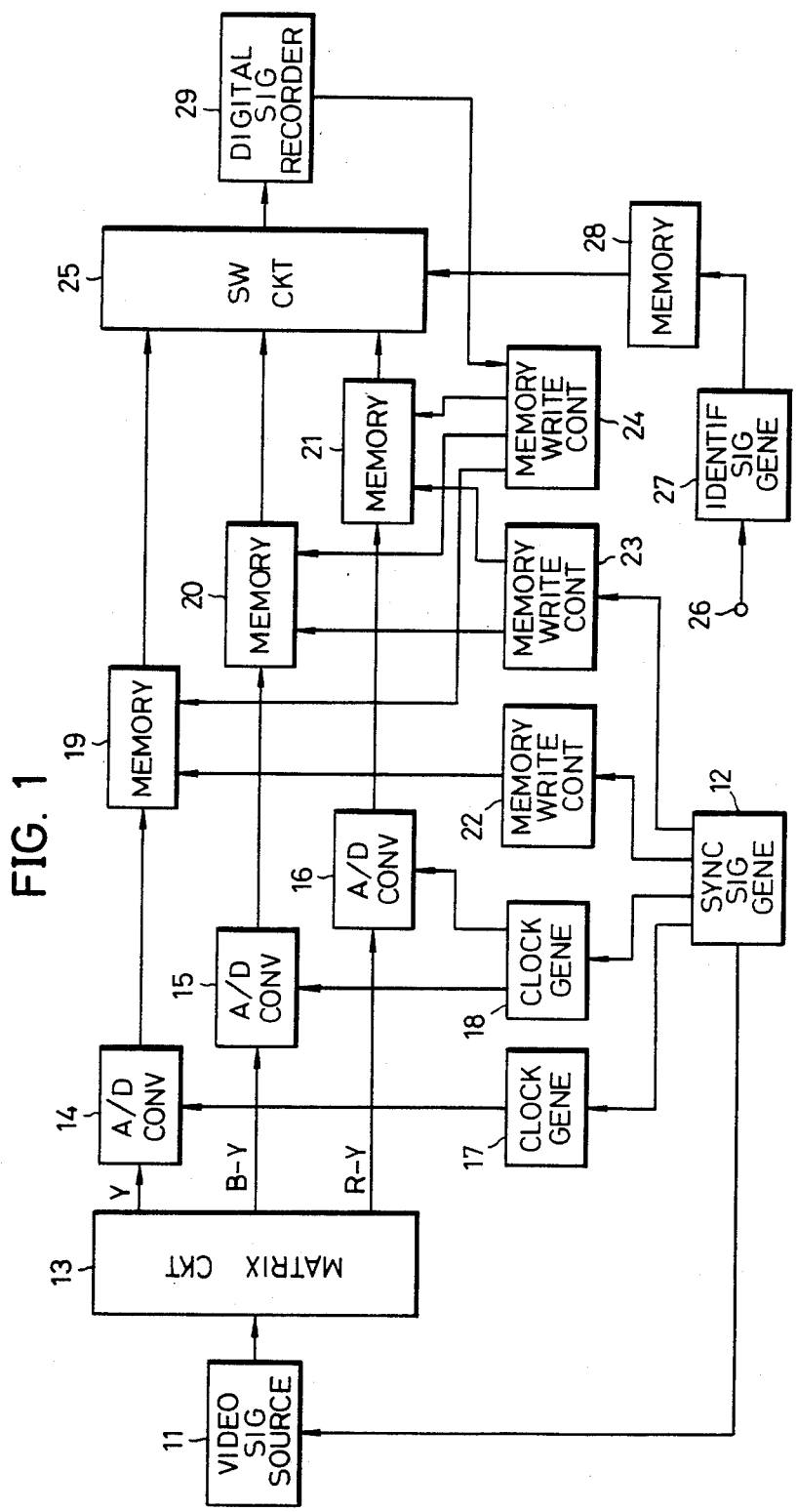
FIG. 1 is a systematic block diagram showing an essential part of an embodiment of a digital signal recording system according to the present invention.

First, description will be given with respect to an embodiment of an essential part of the system according to the present invention, by referring to FIG. 1. A video signal source 11 such as a color television camera, flying spot scanner, video tape recorder (VTR), and the like, is supplied with a television synchronizing signal from a television synchronizing signal generator 12 according to the needs, and produces and supplies three primary color signals related to a color still picture which is to be recorded to a matrix circuit 13. The matrix circuit 13 forms a luminance signal Y and color difference signals (B−Y) and (R−Y) with 625 scanning lines and a horizontal scanning frequency 15.625 kHz, and independently supplies these signals to analog-to-digital (A/D) converters 14, 15, and 16. On the other hand, the output television synchronizing signal of the television synchronizing signal generator 12 is supplied to clock generators 17 and 18 and memory write controllers 22 and 23.

The A/D converter 14 samples the luminance signal Y which is in the range of 5 MHz with a sampling frequency 12 MHz, according to a clock signal of 12 MHz obtained from the clock generator 17, and thereafter converts the luminance signal into a digital luminance signal by quantization with a quantization number of eight bits. The digital luminance signal thus obtained from the A/D converter 14 is supplied to a memory 19. The A/D converter 15 samples one color difference signal (B−Y) from among the color difference signals (B−Y) and (R−Y) having bands which are fractions of the band of the luminance signal by considering the known visual characteristics of man, with a sampling frequency 3 MHz, according to a clock signal of 3 MHz obtained from the clock generator 18, and thereafter converts the color difference signal into a digital color difference signal by quantization with a quantization number of eight bits. This digital color difference signal is supplied to a memory 20. Further, the A/D converter 15 similarly samples the other color difference signal (R−Y) with a sampling frequency 3 MHz according to a clock signal from the clock generator 18, thereafter converts the color difference signal into a digital color difference signal, and supplies this digital color difference signal to a memory 21.

Figure 2:
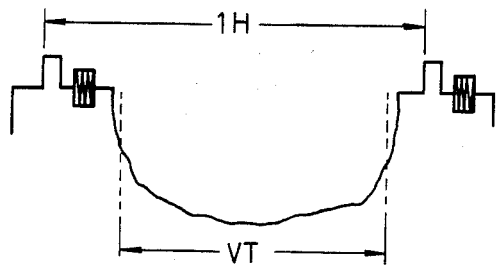
FIG. 2 shows a transmission period of a video signal of a video information which is recorded by the system according to the present invention.

One frame of the above digital luminance signal is written into the memory 19 according to output pulses of the memory write controller 22, and read-out from the memory 19 is successively carried out according to output pulses of a memory read controller 24. For example, the digital luminance signal supplied to the memory 19 is a digital luminance signal with 608 sampling points for one scanning line, that is, 608 picture elements in the horizontal direction. If a luminance signal with 625 scanning lines and a horizontal scanning frequency 15.625 kHz is sampled at a sampling frequency 12 MHz, 768 ($=12\times10^{-6}/15625$) sampling point can be obtained for one scanning line. However, in the video signal shown in terms of horizontal scanning periods in FIG. 2, a video interval VT actually including the video information is in the range of approximately 80% of one horizontal scanning period (1H). On the other hand, the horizontal and vertical synchronizing signals and the color burst signal may be added in the reproducing apparatus. Accordingly, the digital luminance signal with the 608 sampling points within the video interval VT is supplied to the memory 19. In addition, the digital luminance signal read out from the memory 19 is a digital luminance signal related to 572 scanning lines including the picture information among the 625 scanning lines. Moreover, for the reasons which will be explained hereinafter, it is assumed that the digital luminance signal is read out with a sampling frequency 94.5 kHz (or 88.2 kHz) and a quantization number of eight bits.

One frame of the digital color difference signals are written into the respective memories 20 and 21, according to a write-in control signal from the memory write controller 23. The data stored in the memories 20 and 21 are respectively read out according to the output pulses of the memory read controller 24. The digital color difference signals supplied to the memories 20 and 21 have a sampling frequency 3 MHz which is one-fourth the sampling frequency of the digital luminance signal, and are digital signals with 152 ($=608/4$) sampling points for one scanning line. The digital color difference signals are read out as digital signals with a sampling frequency 47.25 kHz (or 44.1 kHz) and a quantization number of eight bits. In addition, the first and second color difference signals read out from the memoried 20 and 21 also relate to picture information of 572 scanning lines, similarly as in the case of the digital luminance signal. In each of these digital signals, digital information which are in accordance with the order of the scanning lines appearing in the picture, that is, digital information of one scanning line positioned at the first position at the top of the picture among the 572 scanning lines (the first H of the first field, where H indicates a horizontal scanning line), digital information of one scanning line positioned at the second position from the top of the picture (the first H of the second field), digital information of one scanning line positioned at the third position from the top of the picture (the second H of the first field), digital information of one scanning line positioned at the fourth position from the top of the picture (the second H of the second field), . . . , are successively and time-sequentially multiplexed. This is to enable facilitated conversion of the number of scanning lines, by considering the case where the number of scanning lines is converted into 525 lines from 625 lines as will be described hereinafter.

The digital luminance signal with the sampling frequency 94.5 kHz (or 88.2 kHz) and the quantization number of eight bits which is read out from the memory 19, the first digital color difference signal with the sampling frequency 47.25 kHz (or 44.1 kHz) and the quantization number of eight bits which is read out from the memory 20, and the second digital color difference signal with the sampling frequency 47.25 kHz (or 44.1 kHz) and the quantization number of eight bits which is read out from the memory 21, are respectively supplied to a switching circuit 25.

Figure 3:
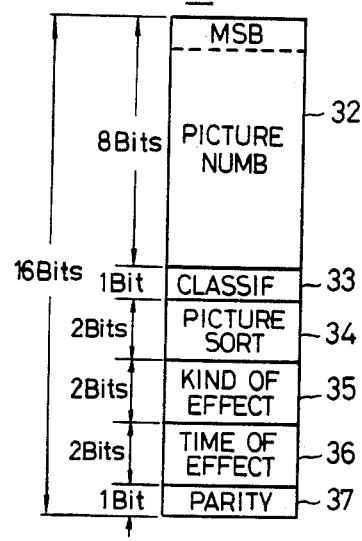
FIG. 3 diagrammatically shows an embodiment of a constitution of an identification signal recorded by the system according to the present invention.

On the other hand, signals such as a signal generated every time the still picture signal to be recorded is changed, are applied to an input terminal 26, and supplied to an identification signal generator 27 which will be described hereinafter. As shown in FIG. 3, the identification signal generator 27 generates an identification signal 31 constituted by sixteen bits, and supplies this identification signal 31 to a memory 28. A digital signal obtained from the memory 28 is supplied to the switching circuit 25. The identification signal 31 comprises an 8-bit picture number identification code 32, 1-bit picture classification identification code 33, 2-bit picture sort identification code 34, 2-bit kind of effect identification code 35, 2-bit time of effect identification code 36, and 1-bit parity code 37. In FIG. 3, the bit shown at the uppermost position corresponds to the most significant bit (MSB). The picture number identification code 32 is a code for identifying the position of a still picture from the point where the recording is started, from among a plurality of still pictures recorded on the same side of the disc. In the present embodiment, it is possible to identify 256 numbers of still pictures because the picture number identification code 32 comprises eight bits.

Suppose that a first digital video signal comprises the digital luminance signal and the first and second color difference signals which are respectively subjected to time-sequential multiplexing, and a second digital video signal relates to the same color still picture information as the first digital video signal but the information quantity of the second digital video signal is compressed to one-fourth of that of the first digital video signal, and the first and second digital video signals are combined time-sequentially for recording as in a digital signal recording system previously proposed by the present inventors in a Japanese Patent Application No. 56-161234. In this case, the picture number identification code 23 is selected to a value indicating the same picture number, because the first and second digital video signals both relate to the same color still picture. For example, in obtaining the above second digital video signal, one field of video signal containing the color still picture information is separated into a luminance signal and color difference signals (B−Y) and (R−Y), the luminance signal is subjected to digital pulse modulation to obtain a digital luminance signal with a sampling frequency 6 MHz and a quantization number of seven bits, the digital luminance signal is further converted into a digital luminance signal with a sampling frequency 94.5 kHz (or 88.2 kHz) and a quantization number of eight bits, the color difference signals (B−Y) and (R−Y) respectively are subjected to digital pulse modulation to obtain two kinds of digital color difference signals with a sampling frequency 1.5 MHz and a quantization number of seven bits, and the digital color difference signals are further converted into color difference signals with a sampling frequency 47.25 kHz (or 44.1 kHz) and a quantization number of eight bits. Thus, in this example, the second digital video signal is a signal in which the digital luminance signal with the sampling frequency 94.5 kHz (or 88.2 kHz) and the quantization number of eight bits and the digital color difference signals with the sampling frequency 47.25 kHz (or 44.1) and the quantization number of eight bits, are respectively time-sequentially multiplexed.

The picture number identification code 32 indicates the same picture number when the first and second digital video signals relate to the same color still picture, regardless of whether the digital luminance signal and the two kinds of digital color difference signals respectively constituting the first and second digital color video signals are successively transmitted in terms of one frame or one field, or successively transmitted in terms of 1H or a plurality of H as in the present invention. Hence, when not only the first digital video signal related to the normal color still picture is transmitted, but the second digital video signal related to the same color still picture and compressed of the information quantity is also transmitted in continuous with the first digital video signal, it is possible to take measures so that the first digital video signal which is first transmitted to the memory circuit within the reproducing apparatus is read into the memory circuit and the second digital video signal is not read into the memory circuit. Further, if the first digital video signal cannot be read into the memory circuit for some reason, it is possible to read the second digital video signal into the memory circuit instead of the first digital video signal.

The picture classification identification code 33 shown in FIG. 3, is a code for identifying whether the digital video signal having an identification signal with this code 33 is the first digital video signal or the second digital video signal. The picture sort identification code 34 is a code for identifying the sort of picture, when it is essential for the display of the picture by the digital video signal to be continuous and the picture is not to be changed to another picture during the display (for example, the display of music or score, scenery, illustration, players, and the like). The kind of effect identification code 35 is a code for identifying whether fade-in or change of picture is to be carried out from the top or the bottom of the picture. The time of effect identification code 36 is a code for identifying the duration of the above special effects such as fade-in and changing of the picture. The reproducing apparatus discriminates this code 36, and operates so that the special effects is completed after the time specified by the code 36 is elapsed. The parity code 37 indicates the result of an operation, when a parity check is carried out with respect to the codes 32, 33, 34, 35, and 36 which amount to fifteen bits.

The identification signal 31 having the above described constitution is formed into a digital signal with a sampling frequency 47.25 kHz (or 44.1 kHz) and a quantization number of sixteen bits at the memory 28, and supplied to the switching circuit 25. The switching circuit 25 switches each of the digital signals supplied from the memories 19, 20, 21, and 28 with a predetermined sequence, and adds a synchronizing signal from a synchronizing signal generator (not shown) to these digital signals. Thus, the switching circuit 25 produces a digital video signal having a signal format shown in FIG. 5, and supplies this digital video signal to a digital recorder 29 wherein the digital video signal is recorded onto a magnetic tape. Moreover, a read-out control signal is produced from the memory read controller 24 in synchronism with a clock signal from the digital recorder 29.

Figure 4:
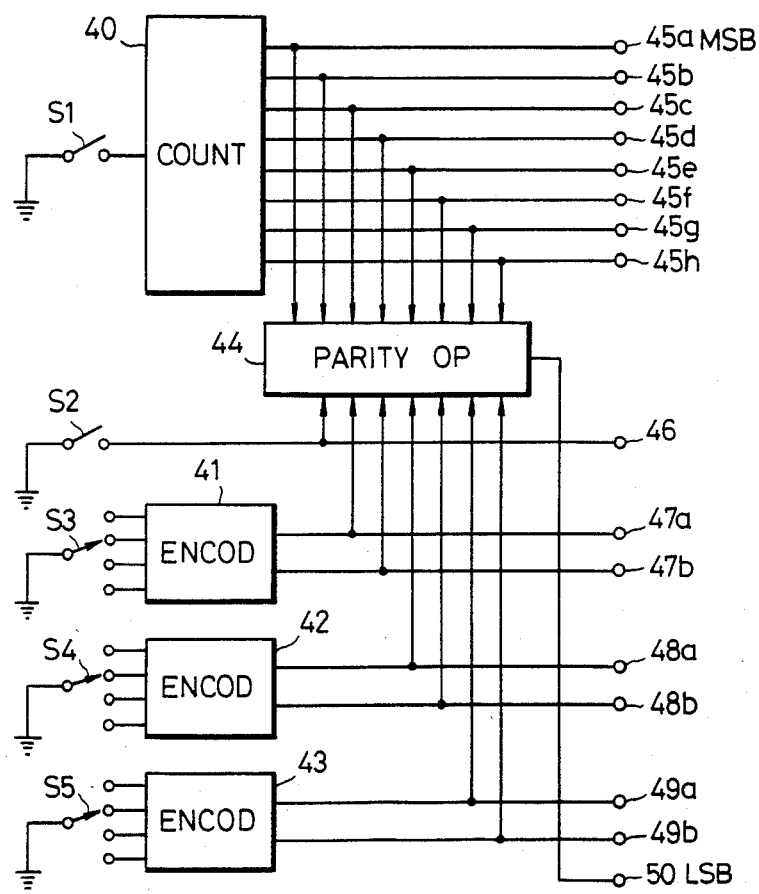
FIG. 4 is a systematic block diagram showing an embodiment of an identification signal generator within the block system shown in FIG. 1, which generates the identification signal shown in FIG. 3.

A block system of an embodiment of the identification signal generator 27 is shown in FIG. 4. Signals obtained due to the opening and closing or switching of a picture number increasing switch S1, picture classification selection switch S2, picture sort selection switch S3, kind of effect selection switch S4, and time of effect selection switch S5, correspond to the signals applied to the input terminal 26 shown in FIG. 1. These switches S1 through S5 are opened and closed manually according to the needs. Every time the switch S1 is closed, the number of times the switch S1 is closed is counted by a counter 40. This closing of the switch S1 is carried out every time the program of the color still picture is changed. Accordingly, an 8-bit signal indicating the position of the color still picture from the point on the recording medium where the recording is started, is produced through 8-bit parallel output terminals 45a through 45h of the counter 40 as the picture classification identification code.

Furthermore, the switch S2 is closed, for example, when the first digital video signal is recorded, and opened when the second digital video signal is recorded. Thus, a 1-bit picture classification identification code is obtained through an output terminal 46. The switches S3, S4, and S5 respectively comprise four contacts, and are connected to respective predetermined contacts according to the desired picture sort, kind of special effect, and time of special effect. Encoders 41, 42, and 43 respectively produce 2-bit signals having values in accordance with the connecting positions of the switches S3, S4, and S5, through output terminals 47a and 47b, 48a and 48b, and 49a and 49b. Hence, a 2-bit picture sort identification code is obtained through the output terminals 47a and 47b, a 2-bit kind of effect identification code is obtained through the output terminals 48a and 48b, and a 2-bit time of effect identification code is obtained through the output terminal 49a and 49b.

In addition, the outputs of the counter 40 and encoders 41, 42, and 43 are respectively supplied to a parity operation circuit 44 wherein a parity operation is carried out and the outputs supplied thereto are converted into a parity code. The parity code thus obtained, is produced through an output terminal 50. As a result, an identification signal comprising a total of sixteen bits, is obtained through the output terminals 45a through 45h, 46, 47a, 47b, 48a, 48b, 49a, 49b, and 50. The MSB of the identification signal is obtained through the output terminal 45a, and a least significant bit (LSB) of the identification signal is obtained through the output terminal 50.

Figure 5:
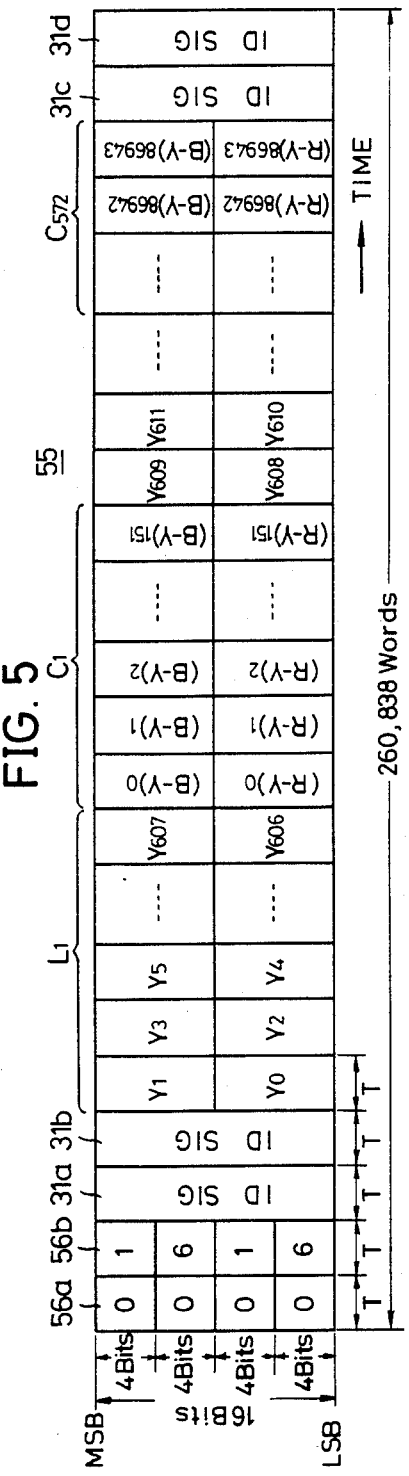
FIGS. 5 and 6 respectively show embodiments of signal formats of a digital video signal recorded by the system according to the present invention.

FIG. 5 shows an embodiment of a signal format of one frame of a digital video signal 55, where the digital video signal 55 comprises digital video signals of 572 scanning lines which actually include the picture information among the 625 scanning lines, synchronizing signals 56a and 56b, and identification signals 31a through 31d. The digital video signal 55 is successively recorded and reproduced in terms of this one frame. In FIG. 5, the vertical direction indicates the bit arrangement, and the top and bottom thereof respectively indicate the MSB and the LSB. Moreover, the horizontal direction indicates the time, and T indicates a unit of time corresponding to a reciprocal of the sampling frequency 47.25 kHz (or 44.1 kHz) and is approximately equal to 21.2 μsec (or 22.7 μsec). The 16-bit data within this time unit T will hereinafter be referred to as one word.

The synchronizing signals 56a and 56b are arranged at the beginning of one frame of digital video signal, to indicate this beginning of one frame of digital video signal. The value "0000" of the synchronizing signal 56a and the value "1616" of the synchronizing signal 56b shown in FIG. 5 respectively are hexadecimal values. Hence, if these values are indicated as binary numbers, all the sixteen bits of the synchronizing signal 56a are "0", while the value of the synchronizing signal 56b becomes "0001011000010110". Identification signals 31a and 31b having similar constitution as the identification signal shown in FIG. 3, are arranged subsequent to the synchronizing signals 56a and 56b. The identification signals 31a and 31b are signals indicating the same value. The same identification signal is repeatedly arranged, in order to reduce errors introduced upon transmission. By providing these two identification signals 31a and 31b, it is possible to determine whether an error exists upon transmission in the reproducing apparatus, and to use one of the two identification signals not containing the error.

Subsequent to the above identification signal 31b, the digital luminance signal of the first H (the first H of the first field) is arranged as indicated by $L_1$ in FIG. 5. Thereafter, the first and second digital color difference signals of the first H are arranged as indicated by $C_1$ in FIG. 5. That is, in FIG. 5, $Y_o$ and $Y_1$ indicate signals at the first and second sampling points of the digital luminance signal of the first H. These signals $Y_o$ and $Y_1$ respectively comprise eight bits, and the signal $Y_1$ at the second sampling point of the digital luminance signal is transmitted by upper eight bits of one word, and the signal $Y_o$ at the first sampling point of the digital luminance signal is transmitted by lower eight bits of the same one word. Similarly, a signal $Y_2$ at a third sampling point of the digital luminance signal of the first H through a signal $Y_{607}$ at a 608-th sampling point of the digital luminance signal, are successively transmitted in pairs. Hence, a total of 304 words are transmitted with respect to the digital luminance signal arrangement $L_1$ of the first H. After transmission of the digital luminance signal arrangement $L_1$ of the first H, the digital color difference signals of the first H are transmitted as indicated by the arrangement $C_1$.

A signal at a first sampling point $(B-Y)_o$ of the first color difference signal of the first H and a signal at a first sampling point $(R-Y)_o$ of the second color difference signal of the first H, are respectively arranged in the first word of the arrangement $C_1$ indicated in FIG. 5. The signal at the sampling point $(B-Y)_o$ is arranged at the upper eight bits of the one word, while the signal at the sampling point $(R-Y)_o$ is arranged at the lower eight bits of the same one word. Similarly, a signal at a second sampling point $(B-Y)_1$ through a signal at a 152-nd sampling point $(B-Y)_{151}$ of the first color difference signal of the first H, and a signal at a second sampling point $(R-Y)_1$ through a signal at a 152-nd sampling point $(R-Y)_{151}$ of the second color difference signal of the first H, are respectively transmitted in pairs, where each pair constitute one word comprising sixteen bits and are signals of the first and second color difference signals at the same sampling point, and the signals at the sampling points $(B-Y)_1$ through $(B-Y)_{151}$ constitute the upper eight bits of each of the words and the signals at the sampling points $(R-Y)_1$ through $(R-Y)_{151}$ constitute the lower eight bits of the same words. Therefore, the first and second color difference signals of 1H are transmitted by a total of 152 words. The digital luminance signal and the first and second color difference signals of the second H (the first H of the second field) are respectively transmitted, after the digital luminance signal and the first and second color difference signals of the first H are transmitted with the arrangements $L_1$ and $C_1$ indicated in FIG. 5. In FIG. 5, $Y_{608}$, $Y_{609}$, $Y_{610}$, and $Y_{611}$ respectively indicate positions of signals at first, second, third, and fourth sampling points of the digital luminance signal of the second H.

Thereafter, similarly as described above, 1H of the digital luminance signal is transmitted in terms of two sampling points, and 1H of the first and second digital color difference signals of the same scanning line as the transmitted digital luminance signal constitute one word by the same sampling points on the picture and are transmitted successively. Such transmission of the digital luminance signal and the digital color difference signals is repeated for a total of one frame, that is, for 572H. In FIG. 5, $C_{572}$ indicates the position of the digital color difference signal of the 572-nd H (286-th H of the second field), and $(B-Y)_{86942}$ and $(R-Y)_{86942}$ indicate the positions of the 151-th sampling points of the first and second digital color difference signal of the 572-nd H. Similarly, $(B-Y)_{86943}$ and $(R-Y)_{86943}$ indicate positions of the 152-nd sampling points. When the transmission of the one frame or 572H of the digital luminance signal and the digital color difference signals is completed, identification signals 31c and 31d of the same content are repeatedly transmitted. The identification signals 31c and 31d are repeatedly transmitted for the same reasons as the identification signals 31a and 31b described before. In addition, these identification signals 31c and 31d are positioned at the end of the signal of one frame so as to enable comparison of contents with those of the identification signals 31a and 31b, and display the digital video signal which is read into the memory by the reproducing apparatus only when the two contents coincide.

As shown in FIG. 5, one frame of the digital video signal is constituted by 260,838 $(=(304+152)\times 572+6)$. Accordingly, one frame of the digital video signal is transmitted within approximately 5.52 $(=1/(47.25\times 10^3)\times 260,838)$ seconds (or 5.91 $(=1/(44.1\times 10^3)\times 260,838)$ seconds).

Figure 6:
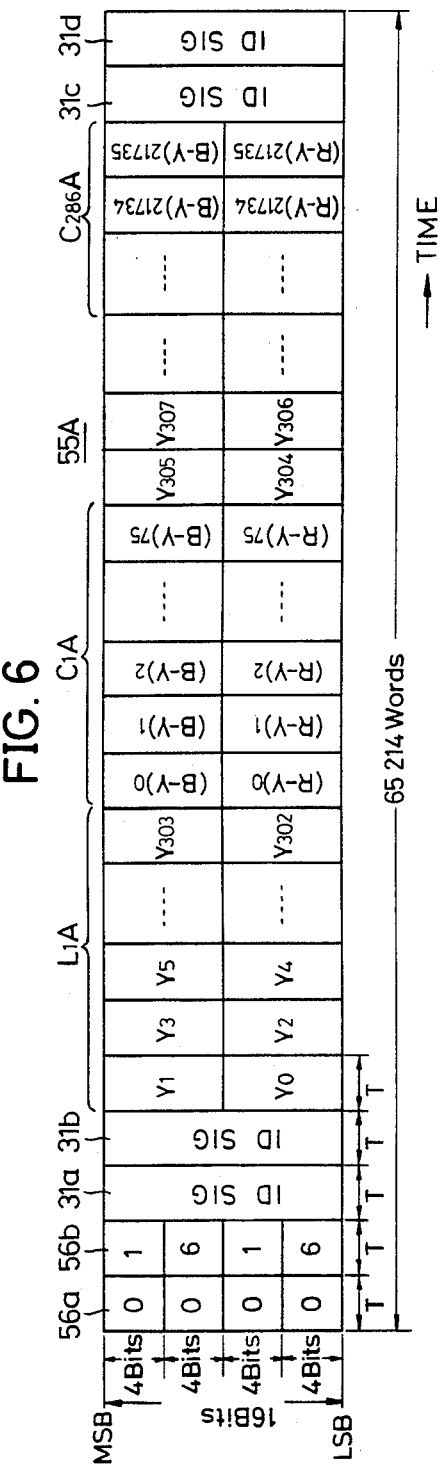

When the second digital video signal is to be further recorded, the switching circuit 25 is operated so that a second digital video signal 55A has a signal format shown in FIG. 6. In FIG. 6, those parts which are the same as those corresponding parts in FIG. 5 are designated by the same reference numerals, and their description will be omitted. In the present embodiment, one field (286H) of the second digital video signal is constituted by 65,214 words, and $L_1A$ indicates the position of the digital luminance signal of the first H, while $C_1A$ and $C_{286}A$ indicate positions of two kinds of digital color difference signals of the first H and 286-th H. After 1H of the digital luminance signal constituted by a total of 152 words is transmitted, 1H of the two kinds of digital color difference signals of the same scanning line constituted by a total of 76 words are transmitted in terms of words constituted by the same sampling points of the digital color difference signals, and such transmission is repeatedly carried out for 286H. The second digital video signal having the signal format shown in FIG. 6 is supplied to the digital recorder 29 according to the needs, and in the present embodiment, the second digital video signal is continuously recorded after the first digital video signal having the signal format shown in FIG. 5.

In FIG. 1, the input digital color difference signals to the memories 20 and 21 may have the same sampling frequency 12 MHz and quantization number of eight bits as the input digital luminance signal to the memory 19, and read out addresses of the memories 20 and 21 may be controlled so as to obtain digital color difference signals with the sampling frequency 47.25 kHz (or 44.1 kHz) and the quantization number of eight bits. However, in such a case, the high-frequency component of the video signal must be eliminated in advance so as to eliminate the folding noise due to the low sampling frequency.

Figure 7:
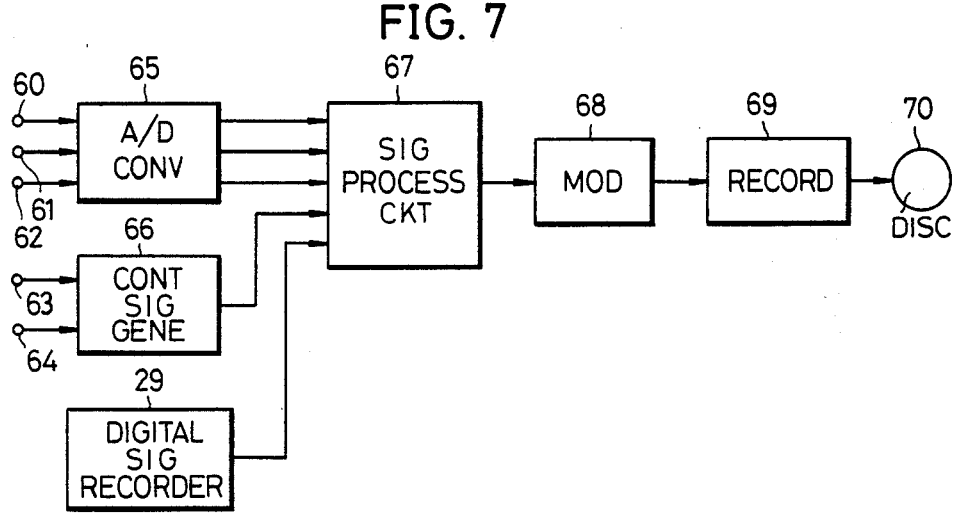
FIG. 7 is a systematic block diagram showing an embodiment of another essential part of the system according to the present invention.

Next, description will be given with respect to a recording system for time sequentially recording the digital video signal onto the disc together with the digital audio signal. FIG. 7 shows an embodiment of a systematic block diagram of an essential part of the system according to the present invention. In FIG. 7, those parts which are the same as those corresponding parts in FIG. 1 are designated by the same reference numerals. Three channels of analog audio signals are respectively applied to input terminals 60, 61, and 62, and supplied to an analog-to-digital (A/D) converter 65. A signal for central acoustic image intersect is included in the three channels of analog audio signals, and by this signal, it is possible to obtain the real image of the central sound source and enlargement of the listening range which could not be obtained in the conventional 2-channel stereo. In addition, a start signal is applied to an input terminal 63, and a cue signal is applied to an input terminal 64. The cue signal is generated every time the music program of the 3-channel analog audio signal changes to a difference music program. The start signal and the cue signal are supplied to a control signal generating circuit 66.

It will be assumed that a digital signal with a sampling frequency 47.25 kHz and a quantization number of sixteen bits and having an information quantity of one channel, is recorded time sequentially onto a disc 70 which will be described hereinafter for four channels on one track turn. Thus, in this case, the 3-channel analog audio signal supplied to the A/D converter 65 is sampled at a sampling frequency 47.25 kHz with respect to each of the channels, and the signal thus converted into a digital audio signal (PCM audio signal) with a quantization number of sixteen bits is supplied to a signal processing circuit 67. At the same time, the digital video signal 55 having the signal format shown in FIG. 5 with the sampling frequency 47.25 kHz and the quantization number of sixteen bits (and further, the second digital video signal 55A having the signal format shown in FIG. 6 with the sampling frequency 47.25 kHz, and the quantization number of sixteen bits) which is reproduced by the digital recorder 29, is also supplied to the signal processing circuit 67. Moreover, the control signal generating circuit 66 which is supplied with the start signal through the input terminal 63 and the cue signal through the input terminal 64, generates a control signal having a constitution which will be described hereinafter in conjunction with FIG. 9, and supplies this generated control signal to the signal processing circuit 67. As will be described hereinafter, the control signal is used for controlling the position of the pickup and reproducing element during an operation such as a random access and the like.

With respect to the sixteen bit of a total of four channels of input digital signals and the control signal, the signal processing circuit 67 rearranges these parallel data into series data, and further sections the digital signals of each of the channels into predetermined sections and subjects these digital signals to time-division multiplexing by interleaving. The recording signal is formed by further adding an error code correction signal, error code detection signal, and synchronizing bit for indicating the beginning of the block (frame) to the time-division multiplexed signal.

Figure 8:
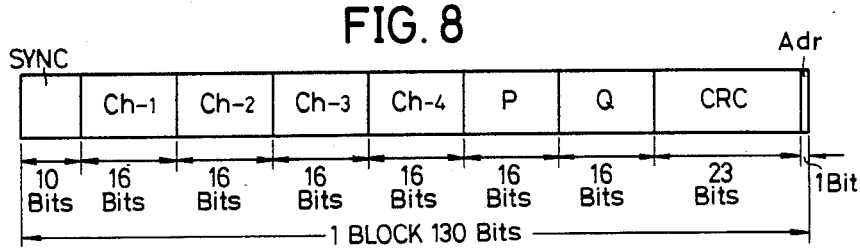
FIG. 8 shows an example of a signal format of one block of a digital signal recorded by the system according to the present invention.

FIG. 8 diagrammatically shows an example of one block (one frame) within the recording signal thus formed by the signal processing circuit 67. One block is constituted by 130 bits, and the repetition frequency is 47.25 kHz which is equal to the sampling frequency. In FIG. 8, a 10-bit synchronizing signal bit having a fixed pattern for indicating the begging of the block is indicated by SYNC, 16-bit digital audio signals of a total of three channels are respectively indicated by ch-1 through ch-3, and 16-bit digital video signal reproduced from the digital recorder 29 is indicated by ch-4. In addition, P and Q indicated in FIG. 8 respectively are 16-bit error code correction signals, and are signals which are formed satisfying the following equations, for example.

$$P = W_1 \oplus W_2 \oplus W_3 \oplus W_4 \quad (1)$$

$$Q = T^4 \cdot W_1 \oplus T^3 \cdot W_2 \oplus T^2 \cdot W_3 \oplus T \cdot W_4 \quad (2)$$

In the above equations (1) and (2), $W_1$, $W_2$, $W_3$, and $W_4$ respectively indicate each of the 16-bit digital signals ch-1 through ch-4 (normally, these signals are digital signals in different blocks), T indicates a companion matrix of a predetermined polynomial, and $\oplus$ indicates a modulo-2 addition in terms of each of the corresponding bits.

Figure 9:
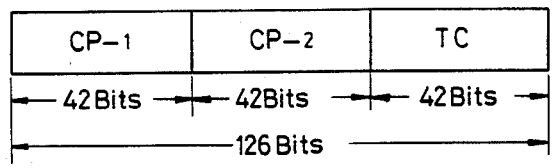
FIG. 9 diagrammatically shows an example of a constitution of a control signal shown in FIG. 8.

In FIG. 8, a 23-bit error code detection signal is indicated by CRC. The error code detection signal CRC is a 23-bit remainder when each of the words ch-1 through ch-4, P, and Q are divided by a formation polynomial $X^{23} + X^5 + X^4 + X + 1$, for example. Upon reproduction, the signals from the 11-th bit to the 129-th bit of the same block are divided by the above formation polynomial, and this error code detection code is used to detect that there is no error when the remainder is zero. The control signal described previously is indicated by Adr. One bit of this control signal Adr is transmitted within one block, and for example, all the bits of the control signal are transmitted by 126 blocks. Accordingly, the control signal shown in FIG. 9 is constituted from 126 bits. Thus, if the rotational speed of the disc 70 is 900 rpm, 3150 blocks are recorded or reproduced for one track turn of the disc 70, and as a result, the above 126-bit control signal is recorded or reproduced 25 times for one track turn of the disc 70.

FIG. 9 diagrammatically shows an example of the constitution of the above described control signal. The 126-bit control signal is constituted from a 42-bit first chapter code CP-1, 42-bit second chapter code CP-2, and 42-bit time code TC. The first chapter code CP-1 comprises a 17-bit synchronizing signal, 4-bit mode signal, 8-bit chapter signal, 12-bit chapter local address, and 1-bit parity code which is obtained by carrying out a modulo-2 addition with respect to the signal bits of the mode signal through the chapter local address. The second chapter code CP-2 has the same constitution and values as the first chapter code CP-1, except for the value of the synchronizing signal. The mode signal is a signal indicating the kind of the four channels of digital signal recorded on the disc 70. For example, if the mode signal is "1100", three channels of digital audio signals and one channel of digital video signal are recorded. Similarly, four channels of digital audio signals are recorded when the mode signal is "1101", two channels of two kinds of digital audio signals are recorded when the mode signal is "1110", and two channels of digital audio signals and two channels of digital video signals are recorded when the mode signal is "1111".

Further, the above chapter signal is a signal indicating the position of a recorded music program from the point on the disc 70 where the recording of the signal is started. On the other hand, since the picture number identification code 32 within the identification signal 31 shown in FIG. 3 indicates the recording order of the still picture, if the still picture simultaneously reproduced upon reproduction of a music program recorded on the disc 70 is successively changed two or more times, the value of the picture number identification code 32 and the value of the chapter signal are mutually different. Moreover, the chapter local address indicates the time in seconds, from the first recording position of each of the music programs.

For example, the time code TC shown in FIG. 9 comprises a 17-bit synchronizing bit, 4-bit mode signal for indicating the kind of the four channels of digital signals recorded on the disc 70 similar to the mode signals within the first and second chapter codes CP-1 and CP-2, 16-bit time identification code for indicating the position of the recorded music program on the disc 70 in terms of time from the point where the recording of the signal is started, 4-bit track number code which is incremented by one for every track turn of the disc 70 and assumes a value from zero to fourteen in binary code, and 1-bit parity code. The time identification code is indicated by a value such as minutes and seconds, and the minimum unit is one second. However, when the disc 70 rotates at a rotational speed of 900 rpm, the disc 70 undergoes 15 revolutions per second. Hence, even if the time identification code assumes the same value, it is possible to identify the position of the recorded music program by the track number code for each revolution of the disc 70.

The digital signal shown in FIG. 8 comprising 130 bits in one block is successively obtained in series in terms of blocks from the signal processing circuit 67, and supplied to a modulation circuit 68 provided in a succeeding stage. The signal supplied to the modulation circuit 68 is subject to modified frequency modulation (MFM), for example, and is converted into a frequency modulating signal by frequency-modulating a carrier of 7 MHz, for example. This frequency modulating signal from the modulation circuit 68 is recorded onto the disc 70 by a recording apparatus 69 using laser beam and the like.

Figure 10:
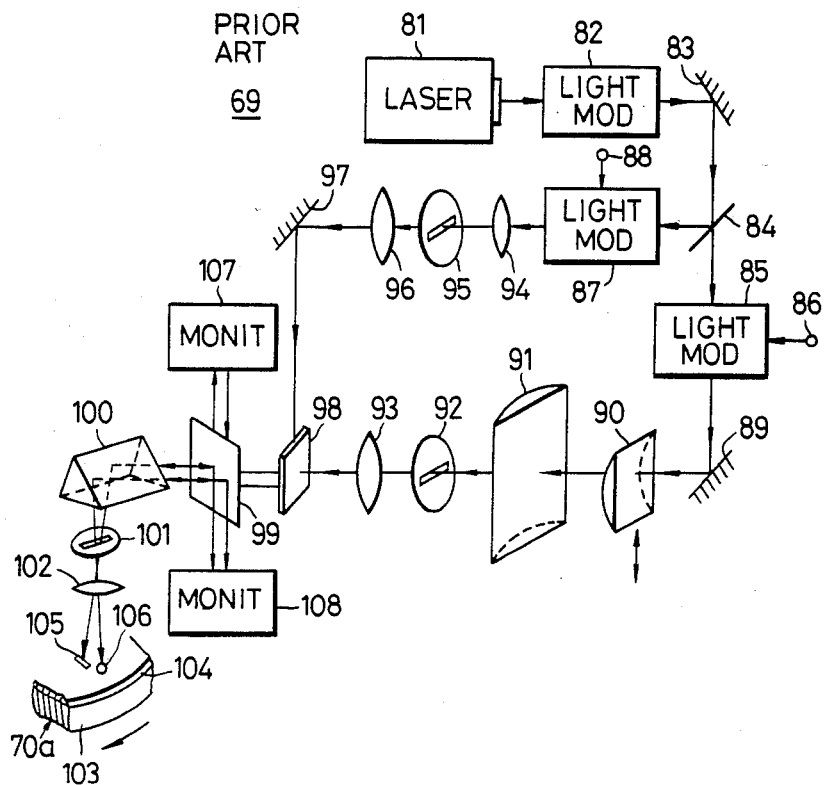
FIG. 10 generally shows an example of a conventional recording apparatus which could record recording signals obtained by the recording system according to the present invention.

A conventional recording apparatus shown in FIG. 10 such as that shown in a U.S. Pat. No. 4,315,283, for example, may be used as the recording apparatus 69. In FIG. 10, a laser light emitted from a laser light source 81 is eliminated of its drift, noise, and the like at a light modulator 82, and is reflected at a reflecting mirror 83 and divided into two optical paths by a half mirror 84. One of the divided laser light is modulated by the output frequency modulating signal of the above modulation circuit 68 and the third tracking control signal fp3 which are obtained through an input terminal 86 at a light modulator 85, and converted into a first modulated light beam. The other divided laser light is modulated by the first tracking control signal fp1 or the second tracking control signal fp2 alternately obtained from a recording original disc 70a through an input terminal 88 at a light modulator 87, and is converted into a second modulated light beam.

The first modulated light beam is reflected at a reflecting mirror 89 and changed of its optical path, and is passed through an information recording optical system comprising a cylindrical lenses 90 and 91, a slit 92, and a convex lens 93, and then formed into a rectangular light beam on the recording original disc 70a. On the other hand, the second modulated light beam is passed through a tracking recording optical system comprising a convex lens 94, a slit 95, and a convex lens 96, and formed into a circular light beam on the recording original disc 70a, and further changed of its optical path by a reflecting mirror 97. The first and second modulated light beams thus formed into light beams of predetermined shapes, are composed on substantially the same optical axis by a deflection prism 98, and then pass through a half mirror 99. The optical paths of the light beams obtained through the half mirror 99 are changed by a prism 100, and the light beams then pass through a slit 101 and a recording lens 102 to reach the recording original disc 70a. A layer 104 of photosensitive agent is formed on a glass substrate 103 of the recording original disc 70a, and as a result, the first modulated light beam is focused as a rectangular spot 105 while the second modulated light beam is focused as a circular spot 106 on the recording original disc 70a.

The recording original disc 70a is a disc-shaped medium, and is rotated at a predetermined rotational speed. In addition, the light reflected by the half mirror 99 is applied to a signal monitoring system 107, while the light reflected by the prism 100 is applied to a monitoring optical system 108. The distance between the two modulated light beams on the recording original disc 70a is measured by the monitoring optical system 108, and the error in the distance between the two modulated light beams is monitored by the signal monitoring system 107. This error in the distance between the two modulated light beams on the recording original disc 70a, is corrected by moving the cylindrical lens 90 upwards and downwards in FIG. 10.

The recording original disc 70a is subjected to the known developing processes and disc manufacturing processes, to form a stamper disc. The disc 70 which is duplicated by the stamper disc, is recorded with a frequency-modulated signal of the signal which is obtained by successively time-sequentially multiplexing the three channels of digital audio signals and the one channel of digital video signal having the signal format shown in FIGS. 5 or 6 in terms of blocks where one block has the signal format shown in FIG. 8. This frequency-modulated signal is recorded on a spiral main track on the disc 70 as rows of intermittent pits. The first and second tracking control signals fp1 and fp2 of a constant frequency within a band lower than the band of the above frequency-modulated signal, are alternately recorded as rows of intermittent pits on subtracks at substantially intermediate parts between centerlines of mutually adjacent main tracks for each track turn of the disc. Further, the third tracking control signal fp3 is recorded on the main track at parts where the sides on which the first and second tracking control signals fp1 and fp2 are recorded change over. Tracking grooves for guiding the reproducing stylus are not formed on the disc 70, and the disc 70 has an electrode function.

Accordingly, in the system according to the present invention, the digital video signal which is recorded together with the digital audio signals, is a signal in which the digital luminance signal of 1H and the first and second color difference signals of 1H of the same scanning line as the digital luminance signal are time-sequentially multiplexed. Moreover, the color difference signal components of the first and second color difference signals with respect to the same sampling point of the picture are recorded within the same word. Thus, as will be described hereinafter, when changing the still picture display by gradually reducing the display area of a first still picture initially displayed by the reproducing apparatus while gradually increasing the display area of a second still picture to finally display only the second still picture, it is possible to carry out such a change of the still picture display introducing almost no degradation in the picture quality. In addition, even if there is a difference or shift by one word upon reproduction, the picture will not becomes distorted because the picture elements (sampling points) on the picture will only shift by two picture elements, and further, because the recording is carried out by alternately transmitting the picture information of the scanning line of the first field and the scanning line of the second field from the top of the picture, it is easy to convert the number of scanning lines as will be described hereinafter. In the embodiment described heretofore, the digital luminance signal and the first and second digital color difference signals are alternately transmitted in terms of 1H and recorded. However, it will be sufficient if the changing of the picture can be carried out within a range allowable from the visual point of view, and for example, the recording may be carried out by alternately transmitting the digital luminance signal and the first and second digital color difference signals in terms of a plurality of H.

Next, description will be given with respect to an embodiment of a reproducing apparatus according to the present invention for reproducing the digital signal recorded in the above described disc 70, by referring to FIG. 11. The disc 70 is placed onto a turntable (not shown) and rotated at a rotational speed of 900 rpm. A bottom of a reproducing stylus 110 slides over the surface of the rotating disc 70. The reproducing stylus 110 is fixed to one end of a cantilever 111, and a permanent magnet 112 is fixed to the other base end of the cantilever 111. The part of the cantilever 111 where the permanent magnet 112 is fixed, is encircled by a tracking coil 113 and a jitter compensation coil 114 fixed to the reproducing apparatus. Right and left coil parts of the jitter compensation coil 114 are wound in the same phase, and thus, attracting forces or repulsive forces simultaneously act on the permanent magnet 112 according to the polarity of a jitter compensation signal. Hence, the cantilever 111 is moved along a tangential direction with respect to the tracks on the disc 70, to compensate for the jitter introduced due to the surface oscillation or eccentricity of the disc 70. Further, the tracking coil 113 generates a magnetic field along a direction perpendicular with respect to the magnetic direction of the permanent magnet 112. Accordingly, the cantilever 111 is moved along one of the directions in the width direction of the track according to the polarity of a tracking error signal from a tracking servo circuit 115 with a displacing quantity according to the magnitude of the tracking error signal.

A high-frequency reproduced signal is obtained from a pickup circuit 116. This pickup circuit comprises a resonance circuit which is varied of its resonance frequency in response to the variations in electrostatic capacitance formed between an electrode fixed to a rear surface of the reproducing stylus 110 by deposition and the disc 70 according to the rows of intermittent pits, a circuit for applying a signal of a constant frequency to this resonance circuit, a circuit for amplitude-detecting a high-frequency signal from the resonance circuit varying in its amplitude according to the above variations in the electrostatic capacitance, and a circuit for preamplifying the amplitude-detected high-frequency signal (reproduced signal). The high-frequency signal obtained from the pickup circuit 116 is supplied to a frequency demodulating circuit 117 wherein the main information signal (the digital audio signals and the time-sequentially multiplexed digital video signal in this case) from the main track is demodulated on one hand, and a part thereof is separated and supplied to the tracking servo circuit 115.

The tracking servo circuit 115 frequency-selects and obtains the first through third tracking control signals fp1 through fp3 from the reproduced signal. Envelopes of the first and second tracking control signals fp1 and fp2 thus obtained are detected and passed through a differential amplifier (not shown) to obtain the tracking error signal, and this tracking error signal is supplied to the tracking coil 113. Here, it must be noted that the positional relationships between the first and second tracking control signals fp1 and fp2 with respect to the main track changes for each track turn of the disc 70. Accordingly, the tracking polarity is reversed for each track turn of the disc 70, by a switching pulse produced according to the detection or reproduction of the third tracking control signal fp3. The tracking servo circuit 115 drives the tracking coil 113 so that the reproducing stylus 110 is forcibly shifted by one or more than track pitch along the track width direction according to a kick instruction signal, when the kick instruction signal is applied to an input terminal 118.

On the other hand, the demodulated digital signal obtained from the frequency demodulator 117 is applied to a decoder 119 wherein the demodulated digital signal is subjected to MFM demodulation and formed into the time-sequentially multiplexed signal having the signal format shown in FIG. 8. The beginning of the block of the time-sequentially multiplexed signal is detected according to the synchronizing signal bit SYNC, and the series signal is converted into a parallel signal, and furthermore, the error is detected. The error code correction signals P and Q are used to correct the error and restore the signal only when an error is detected. Hence, by correcting the error and restoring the signal according to the needs, three channels of the 16-bit digital audio signals comprising no errors among the four channels of 16-bit digital signals restored to their original order with interleaving signal arrangement, are converted into analog audio signals by a digital-to-analog (D/A) converter within the decoder 119 and produced through output terminals 120a, 120b, and 120c. In addition, the pickup control signal is supplied to a predetermined circuit (not shown) for carrying out high-speed search and the like.

The digital video signal having the signal format shown in FIG. 5 (or FIG. 6) which is time-sequentially reproduced from the fourth channel, is supplied to a converting circuit 121 shown in FIG. 11 for converting the number of scanning lines. The number of scanning lines is converted into 525 lines from 625 lines at the converting circuit 121. As described before, the digital video signal relates to the picture information of the scanning line of the first field and the scanning line of the second field which are alternately selected in order from the top of the picture, and the digital luminance signal and the first and second digital color difference signals are alternately reproduced in terms of 1H. The construction of the converting circuit 121 may be simple requiring only simple operations if the intra-frame line interpolation method is employed, and the conversion of the number of scanning lines may be carried out with ease.

Therefore, the converting circuit 121 is a circuit essential to a reproducing apparatus which reproduces the input signal as an analog color video signal in accordance with the NTSC system with the 525 scanning lines. Hence, in the present embodiment, the reproducing apparatus is described as having this converting circuit 121, however, if the input signal is to be reproduced as an analog color video signal in accordance with the SECAM system or the PAL system, there is no need to provide the converting circuit 121. A switch may be provided for switching the input and output of the converting circuit 121, to switch over the switch according to the system under which the signal is to be reproduced. The digital video signal of the system using 525 scanning lines which is serially obtained from the converting circuit 121, is supplied to a switching circuit 122.

The digital video signal obtained from the decoder 119 is supplied to a synchronizing signal detecting circuit 123 wherein the synchronizing signals 56a and 56b transmitted at the beginning of one frame (or one field) of this digital video signal are detected. These synchronizing signals 56a and 56b are transmitted with the fixed patterns of 32 bits as shown in FIGS. 5 and 6. The synchronizing signal detecting circuit 123 supplies a detection signal to a control circuit 124 when the synchronizing signals are detected. Furthermore, the digital video signal obtained from the decoder 119 is supplied to an identification signal detecting circuit 125 and a memory write controller 126. The identification signal detecting circuit 125 is a circuit for detecting the identification signal 31 (31a through 31d) shown in FIGS. 3, 5, and 6, and supplies a detection signal to the control circuit 124.

Each of the above detection signals and a reproducing mode signal, picture sort specifying signal, and the like obtained through an input terminal 127, are supplied to the control circuit 124. The control circuit 124 discriminates the signals supplied thereto, and controls the memory write controller 126, switching circuit 122, switching circuit 131, and the like. The output digital video signal of the converting circuit 121 is selectively produced through the switching circuit 122, and is supplied to one of a memory 128 and a memory 129 respectively having a memory capacity for one frame of the digital video signal. The digital video signal is written into the memory 128 or 129 according to a write-in control signal from the memory write controller 126. Suppose that the first digital video signal having the signal format shown in FIG. 5 and the second digital video signal having the signal format shown in FIG. 6 are successively time-sequentially recorded onto the disc 70 as proposed in the Japanese Patent Application No. 56-161234, and the recording is carried out such that at least the point where the recording of the digital audio signal of the music program is started substantially coincides with a point where the recording of the second digital video signal is terminated. In such a case, the control circuit 124 produces a switching signal for switching the connection of the switching circuit 122 from a terminal a (or b) to a terminal b (or a) when the synchronizing signal and the identification signal of the first digital video signal are detected. When the second digital video signal of the same color still picture is reproduced continuously after the transmission period (approximately 5.52 seconds or 5.91 seconds as described before) of the first digital video signal, the control circuit 124 discriminates that the picture number identification code 32 within the identification signal has the same value as the picture number identification signal obtained immediately before and that the digital video signal is the second digital video signal from the picture classification identification code 33, and maintains the connection state of the switching circuit 122. Moreover, the control circuit 124 controls the memory write controller 126 so that the second digital video signal is not written into the memory 128 or 129. Accordingly, between the output signals obtained from the converting circuit 121, only the first digital video signal is written into the memory 128 or 129, and the second digital video signal of the same picture number is not written into the memory 128 or 129.

On the other hand, when the first digital video signal is reproduced from an intermediate part thereof (during a random access operation, for example), the value of the picture number identification code 32 within the identification signal detected by the identification signal detecting circuit 125 becomes different from the picture number identification signal obtained immediately before. Hence, in this case, the control circuit 124 discriminates that the value of the picture number identification code 32 is different from the obtained immediately before, and switches the connection state of the switching circuit 122, so that the second digital video signal is written into the memory 128 or 129. Accordingly, one frame of the first digital video signal is normally written into the memory 128, and one frame of the first digital video signal which is thereafter reproduced is written into the memory 129. Similarly thereafter, one frame of only the first digital video signal is alternately written into the memories 128 and 129. However, when the synchronizing signal and the identification signal of the first digital video signal are not reproduced, the second digital video signal of the same picture number is written into the memory 128 or 129.

The digital video signal is thus alternately written into the memories 128 and 129. Moreover, according to a read-out control signal from a memory controller and synchronizing signal generating circuit 130, the digital video signal thus written into the memories 128 and 129 is read out simultaneously in parallel, and the jitter introduced upon reproduction is compensated within the memories 128 and 129. The digital luminance signal with the sampling frequency 12 MHz and the quantization number of eight bits and the first and second digital color difference signals with the sampling frequency 3 MHz and the quantization number of eight bits, within the first digital video signal, are read out from the memory 128 or 129 and supplied to the switching circuit 131. On the other hand, when the second digital video signal is written into the memory 128 or 129 and the second digital video signal is to be read out therefrom, the digital luminance signal is read out with a sampling frequency 6 MHz and a quantization number of seven bits and the two kinds of digital color difference signals are read out with a sampling frequency 1.5 MHz and a quantization number of seven bits, for example, and supplied to the switching circuit 131.

The switching circuit 131 is supplied with the control signal from the control circuit 124 and the synchronizing signal from the memory read controller and synchronizing signal generating circuit 130. The switching circuit 131 has a circuit construction so as to selectively produce the digital luminance signal and the two kinds of digital color difference signals read out from the memories 128 and 129, or, when the still picture is to be changed gradually, each of the digital signals read out from the memories 128 and 129 are multiplied with a coefficient which varies at a predetermined speed specified by the time of effect identification code 36 and the like. Among the three kinds of digital signals obtained from the switching circuit 131, the digital luminance signal is supplied to a D/A converter 132, and the two kinds of digital color difference signals are respectively supplied to D/A converters 133 and 134.

Hence, an analog luminance signal is obtained from the D/A converter 132 and supplied to an encoder 135. At the same time, analog color difference signals (B−Y) and (R−Y) are respectively obtained from the D/A converters 133 and 134, and supplied to the encoder 135. The encoder 135 produces a color video signal in accordance with the NTSC system, from the three kinds of analog signals from the D/A converters 132 through 134 and the horizontal synchronizing signal, vertical synchronizing signal, color burst signal, and the like from the memory read controller and synchronizing signal generating circuit 130. This NTSC system color video signal thus produced by the encoder 135 is obtained through a reproduction output terminal 136. This NTSC system color video signal is reproduced and displayed as a color still picture of high quality by a television receiver (not shown), and is used as a supplementary information to the listener when the audio signals are reproduced as sounds through the output terminals 120a, 120b, and 120c.

Next, description will be given with respect to the operation to change the picture being displayed. Normally, the color still picture of the digital video signal read out from the memory 128 (or 129) is displayed, and one frame or one field of a different digital video signal is written into the memory 129 (or 128) during this display period is read out in synchronism with the information contents of the reproduced audio signals, to instantaneously change the entire picture to a color still picture of this difference digital video signal. In addition, when changing the color still picture being displayed to a different color still picture with a special effect such as fade-in, the control circuit 124 discriminates the codes 35 and 36 shown in FIG. 3, and gradually reduces the value of the coefficient which is multiplied to the digital video signal read out from the memory 128 (or 129) and being displayed, according to the discrimination of the codes 35 and 36. On the other hand, the value of the coefficient which is multiplied to the different digital video signal read out from the memory 129 (or 128) is gradually increased. These signals multiplied with the respective coefficients are mixed and multiplexed, and produced through the switching circuit 131, and as a result, the display can be changed to the color still picture of the difference digital video signal read out from the memory 129 (or 128) with the special effect.

Furthermore, when changing the display to a different picture in a successive manner from the top of the picture, the control circuit 124 similarly discriminates the codes 35 and 36 shown in FIG. 3. However, in this case, the write-in and read-out of the digital video signal with respect to the memory 128 (or 129) according to the discrimination of the codes 35 and 36 are carried out in parallel, for example, and the read-out signals are successively supplied to the D/A converters 132 through 134. As described before, the digital luminance signal and the two kinds of digital color difference signals are respectively transmitted alternately in terms of 1H (or a plurality of H), which means that the digital luminance signal and the two kinds of digital color difference signals are respectively transmitted within substantially the same time band. Therefore, when the read out signal is displayed on the screen, the picture can be gradually changed from a certain color still picture to a different color still picture from the top of the picture, substantially without introducing degradation in the picture quality. Moreover, it is possible to change the picture being displayed from the right (or left) of the picture to the left (or right) of the picture.

Next, description will be given with respect to the operation of the apparatus when there is a demand for continuity of the display, that is, when only the music or score is to be displayed, for example. A digital video signal of the score of the music program to be reproduced is recorded on the disc 70, and when the score is to be successively displayed on a plurality of pictures, the digital video signal of the score is intermittently recorded and digital video signals of other kinds (for displaying the player, scenery, and the like, for example) are recorded therebetween. Accordingly, if the disc 70 is reproduced as it is, the display obtained after the display of a certain page of the score is changed does not become the display of a subsequent page of the score, but becomes the display of a different picture which is successively recorded on the disc 70. Hence, in this case, a picture channel for reproducing only the score from the picture contents printed on a case or jacket which accommodates the disc 70 is specified externally, and a specifying signal is applied to the input terminal 127. The control circuit 124 compares this specifying signal obtained through the input terminal 127 with the picture sort identification code 34 within the identification signal obtained from the identification signal detecting circuit 125, and writes in the reproduced digital video signal into the memories 128 and 129 only when the two signals coincide (that is, when the signals both indicate the score). Thus, by reproducing the signals read out from the memories 128 and 129 at this point in time, it is possible to reproduce only the score. Such sole reproduction of a certain picture can be carried out with respect to other picture sort. It is of course possible to reproduce the color still pictures in the order the color still pictures are recorded on the disc 70. In this case, measures are taken so that the comparison is not carried out between the picture sort identification code 34, for example.

As shown in FIGS. 5 and 6 by reference numerals 31a through 31d, the identification signal is recorded before and after the one frame or one field of digital video information with the same content. Hence, if the values of the identification signals do not coincide upon reproduction, the switching operation of the switching circuit 131 is made inoperative by the output signal of the control circuit 124. Moreover, measures are taken so that the signals read out from the memory 128 (or 129) at that point in time are not supplied to the D/A converters 132 through 134, and the signals read out from the memory 129 (or 128) immediately prior to that point in time continue to be selectively produced. Hence, it is possible to prevent distortion in the reproduced picture introduced when the stylus skips or jumps and the like.

When the digital video signal supplied to the memories 128 and 129 shifts by one word due to some cause, for example, the sampling points will becomes shifted by two sampling points (that is, $Y_0$ or $Y_4$ will assume the position of $Y_2$ in FIG. 4, for example). However, the digital luminance signal and the two kinds of digital color difference signals respectively are alternately recorded and reproduced in terms of 1H, and further, the signal components of the same sampling point of the two kinds of digital color difference signals are recorded and reproduced with the same word. For this reason, there is no distortion in the luminance signal and the color difference signals. In addition, because a slight distortion introduced due to the shift by one word is generated at horizontal ends of the reproduced picture, the distortion normally does not appear in the reproduced picture and does not introduce any problems.

Figure 12:
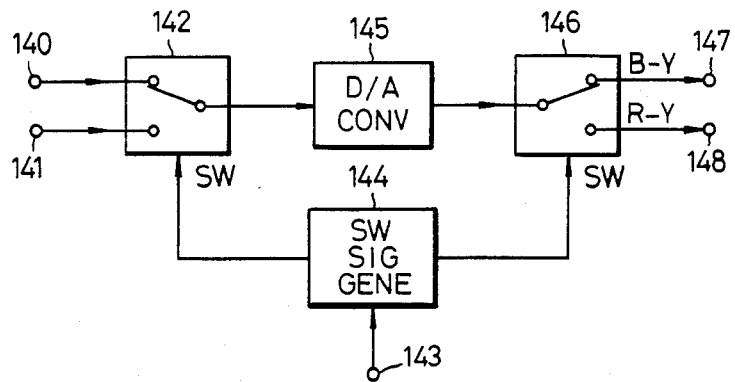
FIG. 12 is a systematic block diagram showing an essential part of another embodiment of a reproducing apparatus according to the present invention.

Description will be given with respect to another embodiment of an essential part of a digital signal reproducing apparatus by referring to FIG. 12. This embodiment is characterized in that only a single D/A converter is used to convert the two kinds of digital color difference signals into analog color difference signals. That is, the two kinds of digital color difference signals obtained through the switching circuit 131 are applied to input terminals 140 and 141, and respectively supplied to a switching circuit 142. The switching circuit 142 selectively produces only one of the signals supplied thereto. A switching signal which is in synchronism with the output synchronizing signal from the memory read controller and synchronizing signal generating circuit 130 obtained through an input terminal 143, is generated by a switching signal generator 144. This switching signal from the switching signal generator 144 is supplied to the switching circuits 142 and 146, to switch these switching circuits 142 and 146 in a linked manner. Accordingly, the first digital color difference signal from the input terminal 140 and the second digital color difference signal from the input terminal 141 are alternately supplied from the switching circuit 142 to a D/A converter 145 in terms of signal components of one sampling point, and are accordingly converted into analog color difference signals.

Therefore, the color difference signals (B−Y) and (R−Y) are alternately obtained from the D/A converter 145 in terms of one sampling period, and supplied to the switching circuit 146. The color difference signal (B−Y) is supplied to an output terminal 147 and the color difference signal (R−Y) is supplied to an output terminal 148 according to the switching operation of the switching circuit 146. The color difference signals (B−Y) and (R−Y) obtained through the output terminals 147 and 148 are respectively supplied to the encoder 135 shown in FIG. 1 together with the luminance signal. The sampling frequency of the two kinds of digital color difference signals supplied to the input terminals 140 and 141 is 3 MHz which is one-fourth the sampling frequency of the digital luminance signal or 1.5 MHz, and is a low frequency. Thus, the switching of the analog color difference signals (B−Y) and (R−Y) can be carried out with ease.

The disc applied with the recording system and reproducing apparatus according to the present invention, is not limited to the disc in the embodiments described heretofore. The disc may be an electrostatic capacitance type disc formed with guide grooves, a disc from which the recorded signals are read by a light beam, and the like. Further, when the television receiver comprises input terminals for three primary color signals R, G, and B, a matrix circuit may be used instead of the encoder 135. In this case, the matrix circuit converts the luminance signal Y and the color difference signals (B−Y) and (R−Y) into the three primary color signals R, G, and B and supplies these three primary color signals R, G, and B to the respective input terminals of the television receiver. Hence, it is possible to obtain a still picture of an exceedingly high quality by such a television receiver. In addition, the color difference signals recorded on the disc 70 may of course be a combination of color difference signals (G−Y) and (R−Y) (or (B−Y)), I and Q signals, or the three primary color signals.

Further, the present invention is not limited to these embodiments, but various variations and modifications may be made without departing from the scope of the present invention.

What is claimed is:

1. A digital signal recording system comprising:
   first producing means for independently subjecting a luminance signal and two kinds of color difference signals of a color picture information to be recorded to digital pulse modulation, to produce a first digital luminance signal and first two kinds of digital color difference signals;
   second producing means for alternately transmitting said first digital luminance signal and said first two kinds of digital color difference signals in terms of information of one or a plurality of scanning lines, and producing a first digital video signal having a signal format wherein signal components of two sampling points of said first digital luminance signal are arranged within the same word and signal components of the same sampling point on a picture of said first two kinds of digital color difference signals are arranged within the same word;
   third producing means for producing digital audio signals by subjecting audio signals of audio information to be recorded to digital pulse modulation; and
   recording means for time-sequentially multiplexing said first digital video signal and said digital audio signals in terms of words, and recording the time-sequentially multiplexed signal onto the same one track on a recording medium.

2. A digital signal recording system as claimed in claim 1 in which between the signal components of the same sampling point of a picture of said first two kinds of digital color difference signals which are arranged and transmitted within the same word, one of the signal components is arranged at upper bits of the word and the other of the signal components is arranged at lower bits of the word.

3. A digital signal recording system as claimed in claim 1 in which a transmission period of one word of said first digital video signal is equal to a reciprocal of a sampling frequency of said digital audio signals.

4. A digital signal recording system as claimed in claim 1 in which said first digital video signal alternately comprises picture information of scanning lines of a first field and picture information of scanning lines of a second field, and is constituted in successive time sequence from a picture information of a top scanning line of the picture.

5. A digital signal recording system as claimed in claim 1 in which a number of scanning lines of the luminance signal and the color difference signals of the color picture information to be recorded is 625 lines.

6. A digital signal recording system as claimed in claim 1 which further comprises means for producing a second digital luminance signal obtained by subjecting said luminance signal to digital pulse modulation with a sampling frequency lower than the sampling frequency of said first digital luminance signal and a second two kinds of digital color difference signals obtained by subjecting said two kinds of color difference signals to digital pulse modulation with a sampling frequency lower than the sampling frequency of said first two kinds of digital color difference signals, means for producing a second digital video signal having an information quantity compressed to a range of several fractions of the information quantity of said first digital video signal from said second digital luminance signal and said second two kinds of digital color difference signals with a signal format similar to the signal format of said first digital video signal, and identification signal generating means for generating an identification signal in correspondence with said first and second digital video signals, said identification signal comprising at least a picture classification identification code for identifying said first and second digital video signals and a picture number identification code for identifying a recording order of the picture information from a point on the recording medium where the recording is started, said picture number identification code assuming the same value with respect to said first and second digital video signal related to the same picture information, said identification signal being added to said first and second digital video signal and recorded onto said recording medium.

7. A digital signal recording system as claimed in claim 6 in which said identification signal is added a plurality of times to respective beginning positions of said first and second digital video signals and recorded onto said recording medium.

8. A digital signal recording system as claimed in claim 6 in which said identification signal is added to respective beginning positions and terminal positions of said first and second digital video signals and recorded onto said recording medium.

9. A digital signal reproducing apparatus for reproducing a recording medium recorded according to the recording system claimed in claim 1, said reproducing apparatus comprising:

reproducing means for picking up and reproducing recorded signals from a recording medium, said first digital video signal and said digital audio signals being time-sequentially multiplexed in terms of words and recorded on the same one track on said recording medium;

a decoder for demodulating and reproducing said digital audio signals from a reproduced signal obtained from said reproducing means, as analog audio signals;

memory means for writing said first digital video signal obtained from a part of said decoder therein, and simultaneously reading out said first digital luminance signal and said first two kinds of digital color difference signals in parallel therefrom;

a digital-to-analog converting circuit for subjecting said first digital luminance signal and said first two kinds of color difference signals from said memory means to digital-to-analog conversion to obtain the luminance signal and the two kinds of color difference signals; and a circuit supplied with outputs of said digital-to-analog converting circuit, for producing an analog video signal in accordance with a standard television system.

10. A digital signal reproducing apparatus as claimed in claim 9 in which said digital-to-analog converting circuit comprises a first digital-to-analog converter for subjecting said digital luminance signal from said memory means to digital-to-analog conversion, a first switching circuit for alternately and selectively producing said first two kinds of digital color difference signals from said memory means, a second digital-to-analog converter for subjecting digital color difference signals obtained from said first switching circuit to digital-to-analog conversion, and a second switching circuit for selectively supplying a first color difference signal to a first output terminal and a second color difference signal to a second output terminal from among color difference signals obtained from said second digital-to-analog converter.

11. A digital signal reproducing apparatus for reproducing a recording medium recorded according to the recording system claimed in claim 6, said reproducing apparatus comprising:

reproducing means for picking up and reproducing recorded signals from a recording medium, said first and second digital video signals, said digital audio signals, and said identification signals being time-sequentially multiplexed in terms of words and recorded on the same one track on said recording medium;

a decoder for demodulating and reproducing said digital audio signals from a reproduced signal obtained from said reproducing means, as analog audio signals;

memory means for writing said first or second digital video signal obtained from a part of said decoder therein, and simultaneously reading out said first or second digital luminance signal and said first or second two kinds of digital color difference signals in parallel therefrom;

memory write-in control means for discriminating said identification signal from the reproduced signal obtained from said reproducing means, and interrupting write-in of the reproduced second digital video signal into said memory means to successively write a reproduced digital video signal of a different picture number into said memory means, only when a value of the picture number identification code within said discriminated identification signal is equal to a value of a picture number identification code within an identification code discriminated immediately prior thereto and it is discriminated from the picture classification identification code that the reproduced digital video signal is said second digital video signal;

a digital-to-analog converting circuit for subjecting said first or second digital luminance signal and said first or second two kinds of color difference signals read out from said memory means to digital-to- analog conversion to obtain the luminance signal and the two kinds of color difference signals; and a circuit supplied with outputs of said digital-to-analog converting circuit, for producing an analog video signal in accordance with a standard television system.

* * * * *